(12) United States Patent
Cornelissen

(10) Patent No.: US 7,518,663 B2
(45) Date of Patent: Apr. 14, 2009

(54) DISPLAY DEVICE WITH MULTI-GROOVED LIGHT DIRECTION ELEMENT AND FIRST AND SECOND ALTERNATING ILLUMINATED LIGHT SOURCES SIMULTANEOUSLY SWITCHED FOR 2D DISPLAY AND SYNCHRONOUSLY SWITCHED FOR 3D DISPLAY

(75) Inventor: Hugo Johan Cornelissen, Eindhoven (NL)

(73) Assignee: Koninklike Philips Electronics N.V., Eindhoven (NL)

( * ) Notice: Subject to any disclaimer, the term of this patent is extended or adjusted under 35 U.S.C. 154(b) by 291 days.

(21) Appl. No.: 10/550,881

(22) PCT Filed: Mar. 26, 2004

(86) PCT No.: PCT/IB2004/050337

§ 371 (c)(1),
(2), (4) Date: Sep. 27, 2005

(87) PCT Pub. No.: WO2004/088996

PCT Pub. Date: Oct. 14, 2004

(65) Prior Publication Data

US 2006/0262558 A1   Nov. 23, 2006

(30) Foreign Application Priority Data

Mar. 31, 2003   (EP)   ................... 03100839

(51) Int. Cl.
G02F 1/1335   (2006.01)
(52) U.S. Cl. .............................. 349/15; 349/62; 349/65; 362/606; 362/620
(58) Field of Classification Search ................... 349/15, 349/61–68; 362/606, 620
See application file for complete search history.

(56) References Cited

U.S. PATENT DOCUMENTS

| | | | |
|---|---|---|---|
| 5,013,108 A | | 5/1991 | Van Amstel |
| 5,382,790 A | * | 1/1995 | Robillard et al. ............ 250/216 |
| 5,465,175 A | * | 11/1995 | Woodgate et al. ........... 359/463 |
| 5,724,108 A | * | 3/1998 | Shibata ........................ 349/62 |
| 6,799,859 B1 | * | 10/2004 | Ida et al. ....................... 362/26 |
| 2003/0063234 A1 | * | 4/2003 | Oda et al. ..................... 349/65 |

FOREIGN PATENT DOCUMENTS

| | | |
|---|---|---|
| EP | 1001298 A1 | 5/2000 |
| EP | 1001299 A1 | 5/2000 |
| JP | 2001066547 A  * | 3/2001 |

* cited by examiner

Primary Examiner—David Nelms
Assistant Examiner—John Heyman
(74) Attorney, Agent, or Firm—Larry Liberchuk

(57) ABSTRACT

A display device with directional backlight produces stereoscopic images by emitting light in two angular cones. Light is alternatively sent to the left and to the right eye of the observer synchronously with switching between images for the left and the right eye on a fast switching LCD. Alternatively, images may be produced for two or more observers and directed towards different directions. The display device includes a display panel, a light redirection element for directing light through the display panel, and a light guide for directing light towards the light redirection element. Two light sources are coupled to the light guide so as to couple light into the light guide in two directions. The light redirection element has a first groove structure and the light guide has a second groove structure so that light from the light sources are directed through the display panel with two angular distributions.

14 Claims, 4 Drawing Sheets

DISPLAY DEVICE WITH MULTI-GROOVED LIGHT DIRECTION ELEMENT AND FIRST AND SECOND ALTERNATING ILLUMINATED LIGHT SOURCES SIMULTANEOUSLY SWITCHED FOR 2D DISPLAY AND SYNCHRONOUSLY SWITCHED FOR 3D DISPLAY

FIELD OF THE INVENTION

The invention relates to a display device and a method of displaying data thereon, and in particular to a display device suitable for mobile use.

BACKGROUND OF THE INVENTION

A common method of displaying images on a screen of a mobile device is to use a screen comprising a liquid crystal display (LCD). In an LCD colour screen, substantially white light is emitted from a light source and transmitted through the screen, i.e. the LCD is backlit. The screen comprises an array of pixels, and each pixel further comprises three capacitors in connection with three colour filters, a red, a green and a blue filter. By carefully controlling the voltages of each capacitor, a specific colour can be produced on the individual pixels, and a screen image is produced by controlling all the pixels. Such a display normally produces 2D images.

Viewing two slightly different images on each eye may produce a 3D vision. This is the so-called stereoscopic effect. One approach for producing stereoscopic images is shown in EP application 1 001 300. Here, two light sources are proposed in conjunction with a mirror system. Light emitted by one light source is directed towards the right eye and light emitted by the other light source is directed towards the left eye. A control means alternately displays an image for the right eye and an image for the left eye on the image-reproducing element. The control means activates the source emitting light for the right eye only when the image for the right eye is displayed, and activates the source emitting light for the left eye only when the image for the left eye is displayed.

Such a display device and other display devices of the prior art comprise complex optical systems, are voluminous, inflexible, expensive and/or difficult to implement.

OBJECT AND SUMMARY OF THE INVENTION

It is an object of the invention to provide a display device having a relatively simple and cheap optical system.

In a first aspect of the invention, this object is achieved by a display device comprising
a display panel;
a light redirection element for directing light through the display panel;
a light guide for directing light towards the light redirection element;
a first light source coupled to the light guide so as to couple light into the light guide in a first direction; and
a second light source coupled to the light guide so as to couple light into the light guide in a second direction;
wherein the light redirection element has a first groove structure and the light guide has a second groove structure, and the first and second groove structures are arranged in a configuration operable to direct light from the first light source through the display panel with a first angular distribution and light from the second light source with a second angular distribution.

The invention provides a display device which is suitable for generating directional images. The display device may be flexible, easy to implement and/or have a low volume. Specifically, the invention provides a display device which has an integrated optical system and may be suitable for mobile use.

The display device may be a liquid crystal display (LCD), and is preferably a display device for one or a few users with a more or less known position with respect to the display. The device may be a laptop computer, a tablet PC, a flat-screen device, a mobile phone, a personal digital assistant (PDA), a handheld organizer, a global positioning (GPS) device, a handheld game computer, etc.

The first and second light sources may be backlight sources, i.e. light sources emitting light towards the rear side of the display panel. Backlighting may be necessary if the display panel is an LCD panel or any other type of transmissive image-reproducing panel.

The display device may further comprise means for alternating between illumination of the first and second light sources and means for alternating between displaying a first and a second image on the display panel substantially synchronously with alternating between illumination of the first and second light sources. The display device may be capable of switching between the first and the second image, so fast that it is not perceivable by a user, i.e. so fast that a user does not perceive any flickering due to the switching between the first and the second image. This may provide a display device on which different images may be sent to a user, e.g. different images may be sent to the left and the right eye of a user. Furthermore, this allows use of a single display device by more than one user.

The display device may comprise an optical system having a first and a second groove structure arranged in an opposed configuration. This may be a robust and flexible way of arranging the first and second groove structures because no additional components may be necessary for directing the light between the two groove structures.

The first groove structure may be a prism structure with a substantially triangular cross-section, wherein an angle of the joining sides forming the triangular cross-section of the prism structure may be between 10° and 70°, and may be preferably 60°, or proximate to 60°. An angle of 60° may be suitable for directing light through the display panel.

The second groove structure may be a prism structure with a substantially triangular cross-section, wherein an angle of the joining sides forming the triangular cross-section of the prism structure may be between 150° and 179°, and may be preferably 175°, or proximate to 175°. An angle of 175° may be suitable for directing light towards the redirection element.

The first and second groove structures may extend in a direction pointing substantially perpendicularly to an axis extending between the eyes of a user of the display panel, when the display device is maintained in a position of use. The display device may be a handheld device, for which a position of use is normally well defined. For example, a mobile phone is normally held in such a way that an axis extending from the display to the keypad is substantially perpendicular to an axis extending between the eyes of a user. If a position of use is not well defined, the user may reposition and/or reorient the device until the direction of the groove structures extends in a direction pointing substantially perpendicularly to an axis extending between the eyes of a user. If the device is not a handheld device, e.g. a flat screen for presenting images, such as a video film, the device may comprise means for changing its orientation and position.

If the display panel is an LCD panel, the first and second groove structures may extend in a direction substantially perpendicular to the rows in the LCD panel.

The first and second light sources may produce a first and a second light cone. These light cones may contain light with a certain angular spread, i.e. the light cones may be characterized by a first and a second angular distribution. The first angular distribution may contain light, which has passed through the display panel while the display panel was showing a first image, and the second angular distribution may contain light, which has passed through the display panel while the display panel was showing a second image. The light with the first angular distribution may be emitted in a first viewing area predominantly containing light from the first light source, and the light with the second angular distribution may be emitted in a second viewing area predominantly containing light from the second light source. By separating the first and the second viewing areas so that they do not overlap, the first and second images may be viewed separately.

The first and second images may be a first and a second image of a 3D stereoscopic image. This may be achieved by sending the first image in a light cone with the first angular distribution and by sending the second image in a light cone with the second angular distribution. In this way, the first image may be sent to one eye of a user, and the second image may be sent to the other eye of the user.

The first image may also be dedicated for a first user and the second image may be dedicated for a second user, whereby at least the first and the second user can view different images from a single display device. This may be achieved by sending the first image in a light cone with a first angular distribution and by sending the second image in a light cone with a second angular distribution. In this way, the first image may be sent to the first user, and the second image may be sent to the second user. The same images may also be sent to the at least first and second users, if the first and second images are identical.

The first and second light sources may be illuminated simultaneously, and in this way a 2D image may be displayed on the display device, because the same image may be sent to both eyes of a user.

The display device may comprises means for switching between illuminating the first and second light sources simultaneously, and illuminating the first and second light sources substantially synchronously with displaying the first and the second image on the display panel. In this way, means may be provided for switching between displaying a 2D image and a 3D stereoscopic image on the display panel. The switching means may be operated by the user or by an electronic control system.

The first and second light sources may be light-emitting diodes (LED) or cold cathode fluorescent lamps.

According to a second aspect of the invention, a method of displaying data on a display device comprises the steps of:
coupling light from a first and a second light source into a
    light guide so as to couple light from the first light source
    into the light guide in a first direction and light from the
    second light source into the light guide in a second direction;
redirecting the light coupled into the light guide towards a
    light redirection element by coupling light out of the light
    guide by an out-coupling surface having a first groove
    structure;
further redirecting the light coupled into the light redirection
    element by coupling light into the light redirection element
    by an in-coupling surface having a second groove structure, such that light from the first light source is directed through the display panel with a first angular distribution and light from the second light source is directed through the display panel with a second angular distribution.

An image of the display panel may be switched between a first and a second image.

The first and second light sources may sequentially operate in synchronization with displaying the first and the second image on the display panel.

These and other aspects, features and/or advantages of the invention are apparent from and will be elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
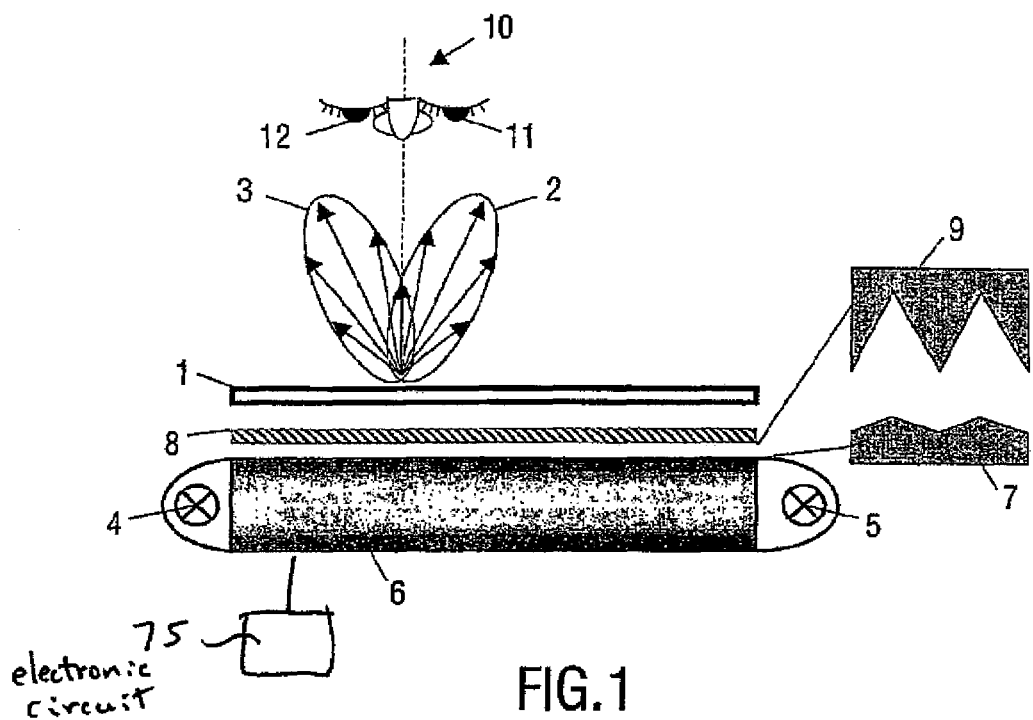
FIG. 1 is a schematic cross-sectional view of a preferred embodiment of the display device.

FIG. 1 is a schematic cross-sectional view of a display device in accordance with a preferred embodiment of the invention. An LCD display 1 is used as a display panel. Light 2, 3 is emitted from light sources 4, 5, e.g. cold cathode fluorescent lamps or light-emitting diodes. The light emitted from the first light source 4 is directed through the display panel 1 with a first angular distribution 2, i.e. in a first light cone, and the light from the second light source 5 is directed through the display panel 1 with a second angular distribution 3, i.e. in a second light cone. Light emitted from the light sources 4, 5 is guided from the light sources by a light guide 6, which has an out-coupling surface with a second groove structure 7. The light, which is coupled out of the light guide 6, is coupled into a light redirection element 8. The light redirection element 8 has an in-coupling surface with a first groove structure 9. The light guide 6 and the light redirection element 8 are arranged in an opposing configuration whereby light is coupled from the light guide into the light redirection element. The light guide 6 and the light redirection element 8 may, however, also be placed with respect to each other in other ways if this is desirable, for example, by means of mirrors or additional light guides, placed so that light is directed from the light guide 6 into the light redirection element 8. A user 10 of the display device may be positioned in such a way that the light emitted in the first light cone is incident on one of the user's eyes 11, whereas light emitted in the second light cone is incident on the other of the user's eyes 12. By operating the light source synchronously with a first and a second image switching on the display panel 8, a first image may be directed to one of the eyes, e.g. the left eye 11, whereas a second image may be directed to the other of the eyes, e.g. the right eye 12. The images may be updated continuously so that a dynamic view is obtained.

Figure 2:
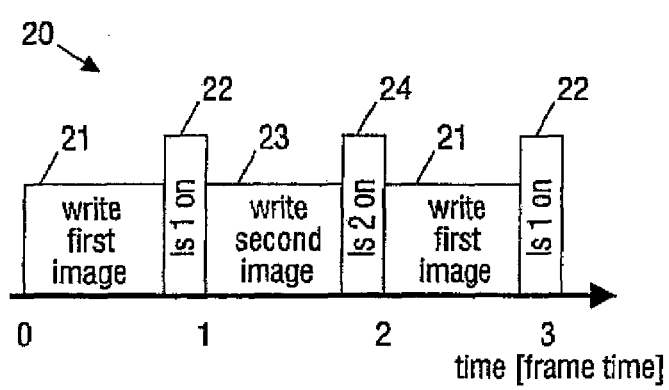
FIG. 2 is a schematic representation of a sequence for the light sources and the first and second images.

The sequence 20 for the light sources and the first and second images is shown in FIG. 2. As a first step in the sequence, the first image is written 21 on the display panel.

This is followed by switching on 22 the first light source, or light source one (Is 1) for a given period of time. Then the second image is written 23 on the display panel. This is followed by switching on 24 the second light source, or light source two (Is 2) for a given period of time. This sequence is repeated while the display device is in use. Thus, light is time-sequentially sent into a first light cone and a second light cone. The switching of the light sources as well as the images on the display panel may be controlled by an electronic circuit 75 incorporated in the display device. The electronic circuit may be connected to, or may include a timer circuit for controlling the synchronicity of the sequence.

Figure 3:
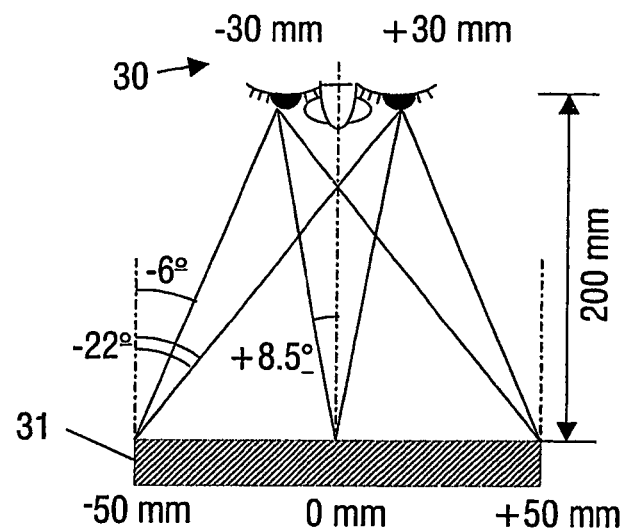
FIG. 3 illustrates an example of a requirement of the angular separation of the light cones.

The requirement of the angular separation of the light cones depends on the viewing distance. Angles and distances are indicated in FIG. 3 for a user 30 at a certain distance from the display device 31. At an eye distance of 60 mm and a viewing distance of 200 mm, the angular separation between the eyes is: 2 Arctan(30/200)=17°. At a viewing distance of 300 mm, this angular separation reduces to 11.4°. From the right-hand side of the display, and a viewing distance of 200 mm, the right eye is at −6°, the left eye at −22°. From the centre of the display, the right and left eyes are symmetrically at ±8.5°.

Figure 4:
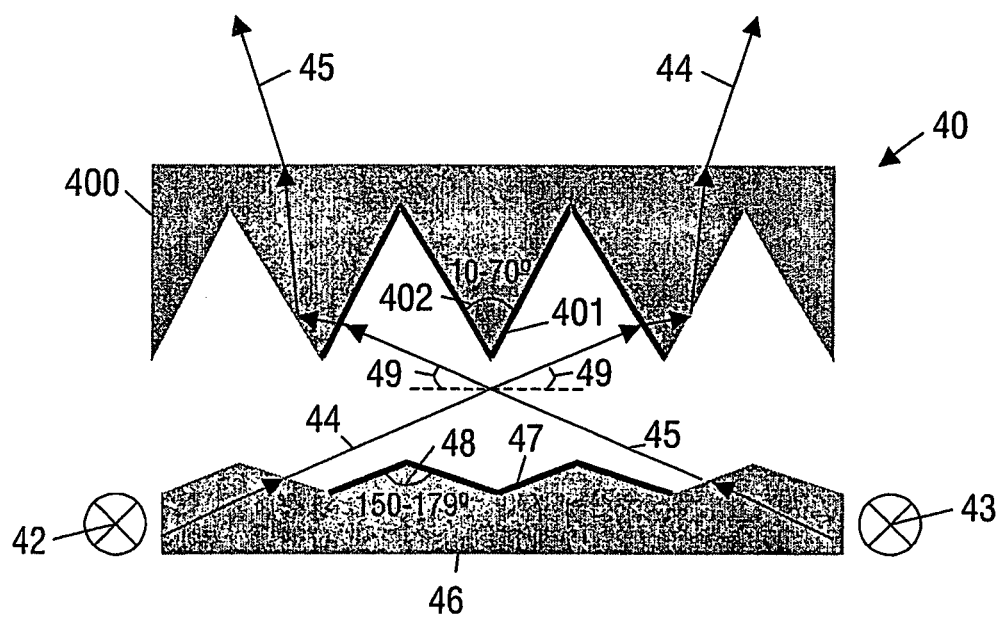
FIG. 4 illustrates details of the first and the second prism structure.

FIG. 4 illustrates details of the two prism structures 40. Light 44 from the first light source 42 is coupled into the light guide 46. The light guide has an out-coupling surface 47 with a second groove structure. The second groove structure is a prism structure with a substantially triangular cross-section. The prism structure of the out-coupling surface 47 of the light guide 46 is rather flat, characterized by an angle 48 between 150° and 179° of the joining sides forming the triangular cross-section, referred to as the apex angle. The purpose of the out-coupling surface is to direct light 44 from the first light source 42 and light 45 from the second light source 43 in substantially counter-propagating cones. It is advantageous to obtain light cones which at this stage are counter-propagating with small rise angles 49 to obtain optimal separation of the cones 44, 45.

The light is coupled into the display panel via light redirection element 400. The light redirection element has an in-coupling surface 401 with a first groove structure. Similarly as the second groove structure, the first groove structure is a prism structure with a substantially triangular cross-section. The prism structure of the light redirection element 400 is steeper than the prism structure of the light guide 46. The prism structure of the light redirection element is characterized by an angle between 10° and 70° of the joining sides forming the triangular cross-section, referred to as the apex angle. The purpose of the light redirection element is to redirect the light 44, 45 so that light is coupled into the display panel at proper angles.

Controlling the direction of the light through the display panel is a matter of controlling the refractive indices along the ray path, as well as the apex angles 48 of the out-coupling surface of the light guide and the in-coupling surface of the light redirection element 402. The angle of refraction is a function of the refractive indices on the two sides of the refracting surface, and, similarly, the transmission coefficient as a function of the refractive angle is also a function of the refractive indices. Furthermore, by using materials which are surface-treated so that the refractive index is a function of the position away from the surface, the angle of refraction, as well as the transmission coefficient may be tuned. Therefore, by choosing materials with specific refractive indices as well as specific apex angles, the light may be directed from the emitting light sources to the user at an optimal angle separation.

Figure 5:
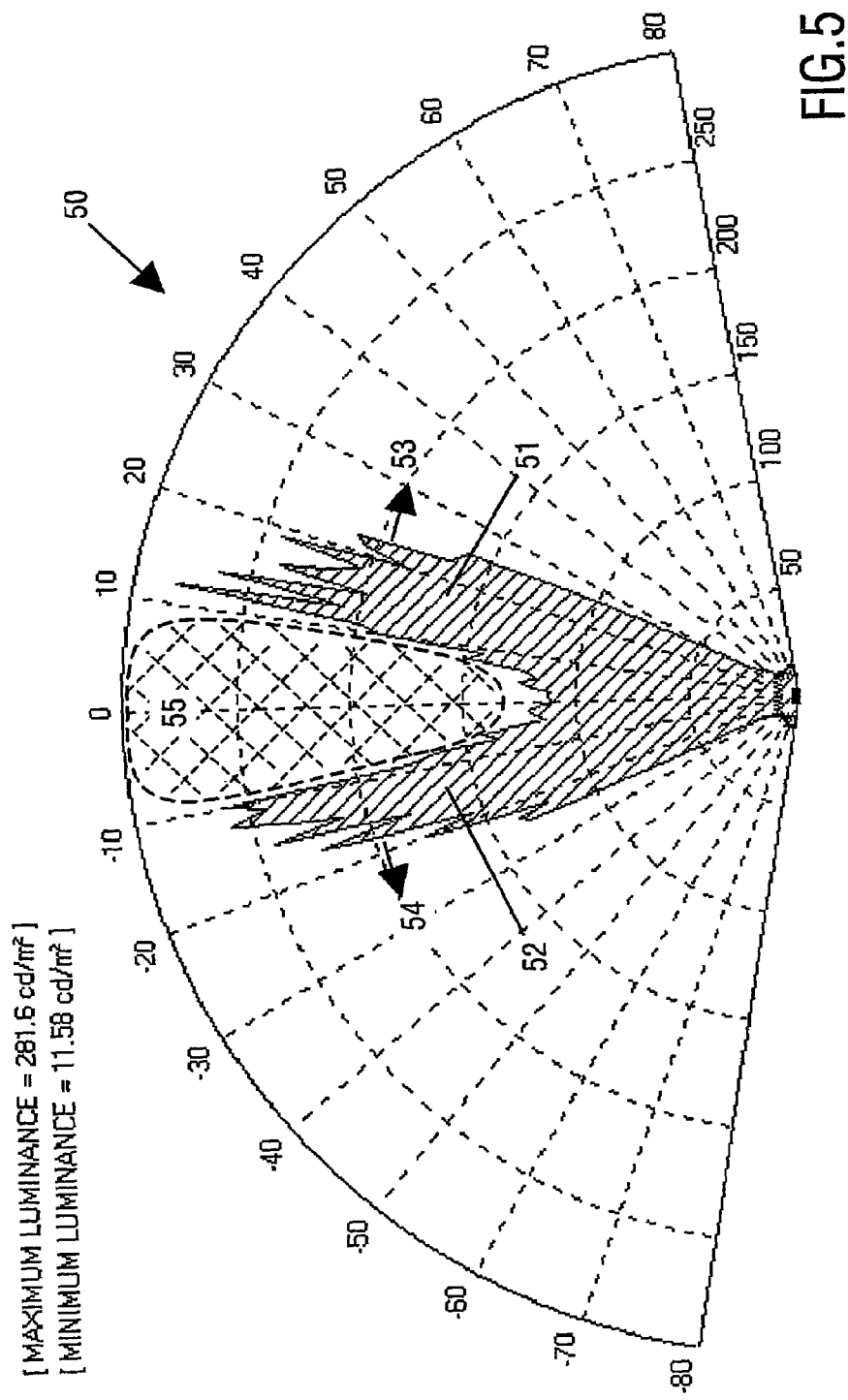
FIG. 5 illustrates an angular distribution plot of a prototype of a display device.

FIG. 5 illustrates an angular distribution plot 50 of a prototype of a display device. The intensity of emitted light is shown as a function of the angle in the same plane as the cross-sections of the two prism structures 47, 401 illustrated in FIG. 4. In the prototype, the apex angle of the light guide was chosen to be 175°, whereas the apex angle of the light redirection element was chosen to be 60°. It is important that the first angular distribution 52 is emitted in a first viewing area and that the second angular distribution 51 is emitted in a second viewing area, so that there is at least one area 55 where the first and the second angular distributions do not overlap. It is less important that the distributions spread in the directions 53 and 54, or any directions not contained within the area 55 limited by the two viewing areas. It may, however, be an advantage to avoid a spread in the directions 53 and 54 due to energy considerations, because a broad distribution requires more energy than a narrow distribution.

The angular separation of the light cones is a function of a number of parameters, including the apex angles and the material choices of the light guide and the light redirection element. The light guide and the light redirection element are preferably made of transparent, or semitransparent, materials, e.g. glass or a transparent, or semitransparent, plastic material such as polymethyl methacrylate (PMMA). The exact design therefore depends upon the position of use for the device, as well as the mode of operation. Two modes of operation are envisioned.

In a preferred embodiment of the invention, the display device is of a type which is capable of displaying 3D stereoscopic images on the display device. This is realized by directing the first light cone to the left eye of a user and the second light cone to the right eye of the user, synchronously with displaying the image for the left eye and the image for the right eye on the display panel. Thus, in FIG. 2, the first image should be the image for the left eye and the second image should be the image for the right eye. If a user maintains the display device at a distance so that the first light cone is incident on the left eye and the second light cone is incident on the right eye, e.g. as in FIG. 3, the user will then be able to see 3D stereoscopic images on the display panel of the display device if, at the same time, the user orients the device in such a way that it is maintained in a position of use. A position of use is where the first and second groove structures extend in a direction pointing substantially perpendicularly to an axis extending between the eyes of a user of the display panel.

Not all images generated on a display device are suitable for 3D stereoscopic viewing, such as images consisting of text, or the user may not want to view the images in a 3D stereoscopic mode. The display device may therefore comprise means for switching between displaying a 3D stereoscopic image and a 2D image on the display panel. A 2D image is displayed on the display device when the first and second light sources are illuminated simultaneously, as both eyes receive the same information. Alternatively, the images for the left and the right eye are identical. Another possibility is that the first and second light sources are illuminated simultaneously and the images for the left and the right eye are identical. The switching means may be user-controlled as well as apparatus-controlled. The user may press a switch, a button or the like, or the switching may be controlled by control software, an operating system, or the like.

In another embodiment of the invention, the display device is of a type which is capable of displaying 2D images for at least two users. The images may be different, so that more users can view different images from a single display device.

Alternatively, the images may be identical, so that more users can use a single display device. This is illustrated in FIG. 6.

Figure 6:
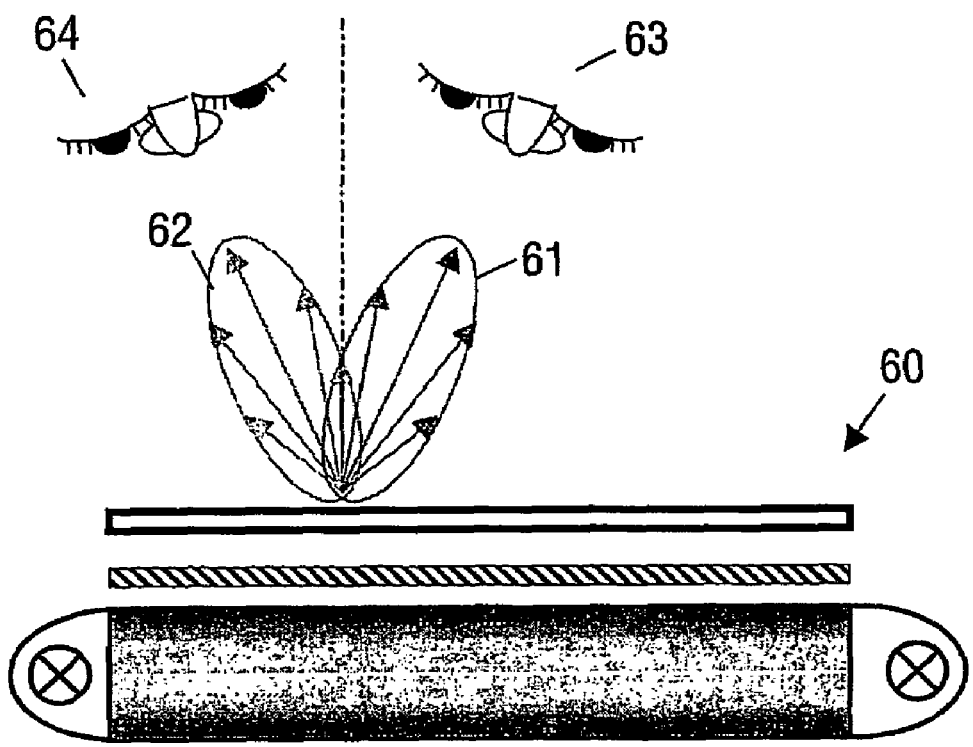
FIG. 6 is a schematic drawing of two users viewing images from the same device.

FIG. 6 is a schematic drawing of two users viewing images from the same device. In this embodiment, the groove structure of the display device 60 is adapted so that the first light cone 61 is directed to a first user 63, whereas the second light cone 62 is directed to a second user 64.

The embodiment shown in FIG. 6 enables more than one user to share one display device, for example, in connection with a vehicle. The advantage of a vehicle is that the positions of the users are relatively fixed. A display device may, e.g., be mounted in the ceiling of a car, so that the backseat passenger may view a film in this way. The display device may be extended to include a number of light sources and grooves structures, so that more than two users may use a single display device. For example, four passengers in a car may use a single display device. The driver of the car may view an image with a map, e.g. connected to a GPS, whereas the passengers may watch a film.

Although the present invention has been described in connection with preferred embodiments, it is not intended to be limited to the specific form set forth herein., The scope of the present invention is rather limited only by the accompanying claims.

The invention claimed is:

1. A display device comprising:
    a display panel;
    a light redirection element for directing light through the display panel;
    a light guide for directing light towards the light redirection element;
    a first light source coupled to the light guide so as to couple light into the light guide in a first direction;
    a second light source coupled to the light guide so as to couple light into the light guide in a second direction;
    means for alternating between illumination of the first and second light sources and means for alternating between displaying a first image and a second image on the display panel substantially synchronously with alternating between illumination of the first and second light sources; and
    means for switching between illuminating the first and second light sources simultaneously, and illuminating the first and second light sources substantially synchronously with displaying the first image and the second image on the display panel;
    wherein the first image and the second image are images of a 3D stereoscopic image;
    wherein when the first and second light sources are illuminated simultaneously, a 2D image is displayed on the display device;
    wherein the light redirection element has a first groove structure having a first longitudinal axis and the light guide has a second groove structure having a second longitudinal axis and facing the first groove structure, and the first and second groove structures are arranged in a configuration operable to direct light from the first light source through the display panel with a first angular distribution and light from the second light source with a second angular distribution which is different from the first angular distribution, the first longitudinal axis being substantially parallel to the second longitudinal axis.

2. The display device as claimed in claim 1, wherein the first and second groove structures of the light redirection element and the light guide are arranged in an opposed configuration.

3. The display device as claimed in claim 1, wherein the first groove structure is a prism structure with a substantially triangular cross-section.

4. The display device as claimed in claim 3, wherein an angle of the joining sides forming the triangular cross-section of the prism structure of the first groove structure is between 10° and 70°.

5. The display device as claimed in claim 1, wherein the second groove structure is a prism structure with a substantially triangular cross-section.

6. The display device as claimed in claim 5, wherein an angle of the joining sides forming the triangular cross-section of the prism structure of the second groove structure is between 150° and 179°.

7. The display device as claimed in claim 1, wherein the first and second groove structures extend in a direction substantially perpendicular to an axis extending between the eyes of a user of the display panel when in use, when the display device is maintained in a position of use.

8. The display device as claimed in claim 1, wherein the light with the first angular distribution is emitted in a first viewing area predominantly containing light from the first light source, and wherein the light with the second angular distribution is emitted in a second viewing area predominantly containing light from the second light source.

9. The display device as claimed in claim 1, wherein the first and second light sources are light-emitting diodes (LED) or cold cathode fluorescent lamps.

10. The display device as claimed in claim 1, wherein the display panel is a liquid crystal display (LCD) panel.

11. The display device as claimed in claim 10, wherein the first and second groove structures extend in a direction substantially perpendicular to rows in an LCD panel.

12. The display device of claim 1, wherein the first groove structure is a first prism structure with a substantially first triangular cross-section having a first apex angle which is between 10° and 70°, and wherein the second groove structure is a second prism structure with a substantially second triangular cross-section having a second apex angle which is between 150° and 179°.

13. A method of displaying 3-D and 2-D images on a display device, the method comprising:
    coupling light from a first and a second light source into a light guide so as to couple light from the first light source into the light guide in a first direction and light from the second light source into the light guide in a second direction;
    redirecting the light coupled into the light guide towards a light redirection element by coupling light out of the light guide by an out-coupling surface having a second groove structure;
    further redirecting the light coupled into the light redirection element by coupling light into the light redirection element by an in-coupling surface having a first groove structure having a first longitudinal axis and facing the second groove structure having a second longitudinal axis, such that light from the first light source is directed through the display panel with a first angular distribution and light from the second light source is directed through the display panel with a second angular distribution which is different from the first angular distribution, the first longitudinal axis being substantially parallel to the second longitudinal axis;
    when switched to the 3-D mode:
    alternating between illumination of the first and second light sources and alternating between displaying a first image and a second image on the display panel substantially synchronously with alternating between illumination of the first and second light sources wherein the first image and the second image are images of a 3D stereoscopic image; and when switched to the 2-D mode:

illuminating the first and second light sources simultaneously whereby a 2D image is displayed on the display device.

14. The method of claim 13, wherein the first groove structure is a first prism structure with a substantially first triangular cross-section having a first apex angle which is between 10° and 70°, and wherein the second groove structure is a second prism structure with a substantially second triangular cross-section having a second apex angle which is between 150° and 179°.

* * * * *